_(12)_ United States Patent
Bisaiji et al.

(10) Patent No.: US 9,890,679 B2
(45) Date of Patent: Feb. 13, 2018

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi (JP)

(72) Inventors: Yuki Bisaiji, Mishima (JP); Kohei Yoshida, Gotemba (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/910,055

(22) PCT Filed: Jun. 19, 2014

(86) PCT No.: PCT/JP2014/066917
§ 371 (c)(1),
(2) Date: Feb. 4, 2016

(87) PCT Pub. No.: WO2015/019737
PCT Pub. Date: Feb. 12, 2015

(65) Prior Publication Data
US 2016/0177798 A1    Jun. 23, 2016

(30) Foreign Application Priority Data
Aug. 8, 2013    (JP) ................. 2013-165465

(51) Int. Cl.
*F01N 3/10*    (2006.01)
*F01N 3/20*    (2006.01)
(Continued)

(52) U.S. Cl.
CPC ......... *F01N 3/208* (2013.01); *B01D 53/9409* (2013.01); *B01D 53/9422* (2013.01);
(Continued)

(58) Field of Classification Search
CPC ............ B01D 53/9409; B01D 53/9422; B01D 53/9477; B01D 53/9495; B01D 2251/208;
(Continued)

(56) References Cited

U.S. PATENT DOCUMENTS

2001/0054282 A1\* 12/2001 Lang .................. B01D 53/9495
                                                                        60/277
2009/0173064 A1\* 7/2009 Ren ........................ F01N 3/0821
                                                                        60/299

(Continued)

FOREIGN PATENT DOCUMENTS

CN    102713189 A    10/2012
CN    103003539 A    3/2013
(Continued)

*Primary Examiner* — Jason Shanske
*Assistant Examiner* — Matthew T Largi
(74) *Attorney, Agent, or Firm* — Andrews Kurth Kenyon LLP

(57) ABSTRACT

An internal combustion engine in which a hydrocarbon feed valve, exhaust purification catalyst, and $NO_X$ selective reduction catalyst are arranged in an engine exhaust passage. A first $NO_X$ removal method which injects hydrocarbons from the hydrocarbon feed valve within a predetermined range of period and uses the reducing intermediate which is generated due to this so as to reduce the $NO_X$ contained in the exhaust gas and a second $NO_X$ removal method which makes the air-fuel ratio of the exhaust gas flowing into the exhaust purification catalyst rich with a period longer than this predetermined range are used. When the first $NO_X$ removal method should be used and the amount of adsorbed ammonia at the $NO_X$ selective reduction catalyst is large, use of the first $NO_X$ removal method is stopped.

4 Claims, 12 Drawing Sheets

(51) Int. Cl.
*B01D 53/94* (2006.01)
*F01N 3/08* (2006.01)
*F02D 41/02* (2006.01)
*F01N 9/00* (2006.01)
*F01N 3/035* (2006.01)
*F02D 41/40* (2006.01)

(52) U.S. Cl.
CPC ..... *B01D 53/9477* (2013.01); *B01D 53/9495* (2013.01); *F01N 3/0814* (2013.01); *F01N 3/0842* (2013.01); *F01N 3/0871* (2013.01); *F01N 3/2066* (2013.01); *F02D 41/0235* (2013.01); *F02D 41/0275* (2013.01); *B01D 2251/208* (2013.01); *B01D 2255/1021* (2013.01); *B01D 2255/20738* (2013.01); *B01D 2255/50* (2013.01); *B01D 2255/91* (2013.01); *B01D 2258/012* (2013.01); *F01N 3/035* (2013.01); *F01N 9/007* (2013.01); *F01N 2240/30* (2013.01); *F01N 2370/02* (2013.01); *F01N 2430/06* (2013.01); *F01N 2510/06* (2013.01); *F01N 2610/02* (2013.01); *F01N 2610/03* (2013.01); *F01N 2900/0412* (2013.01); *F01N 2900/0416* (2013.01); *F01N 2900/0422* (2013.01); *F01N 2900/1402* (2013.01); *F01N 2900/1602* (2013.01); *F01N 2900/1614* (2013.01); *F01N 2900/1622* (2013.01); *F02D 41/402* (2013.01); *F02D 2200/08* (2013.01); *Y02T 10/24* (2013.01)

(58) Field of Classification Search
CPC .. B01D 2255/1021; B01D 2255/20738; B01D 2255/50; B01D 2255/91; B01D 2258/012; F01N 3/0814; F01N 3/0842; F01N 3/0871; F01N 3/2066; F01N 3/208; F01N 2240/30; F01N 2370/02; F01N 2430/06; F01N 2510/06; F01N 2610/02; F01N 2610/03; F01N 2900/0412; F01N 2900/0416; F02D 41/0235; F02D 41/0275
See application file for complete search history.

(56) References Cited

U.S. PATENT DOCUMENTS

| | | |
|---|---|---|
| 2011/0005204 A1* | 1/2011 | Bandl-Konrad ... B01D 53/9431 60/276 |
| 2012/0275963 A1 | 11/2012 | Umemoto et al. |
| 2013/0058840 A1 | 3/2013 | Inoue et al. |
| 2013/0074475 A1 | 3/2013 | Inoue et al. |
| 2013/0081378 A1 | 4/2013 | Bisaiji et al. |
| 2013/0149198 A1 | 6/2013 | Umemoto et al. |
| 2013/0149205 A1 | 6/2013 | Bisaiji et al. |
| 2013/0315790 A1 | 11/2013 | Bisaiji et al. |

FOREIGN PATENT DOCUMENTS

| | | | |
|---|---|---|---|
| CN | 103180558 A | 6/2013 | |
| EP | 2239432 A1 | 10/2010 | |
| EP | 2447488 A1 | 5/2012 | |
| EP | 2460990 A1 | 6/2012 | |
| EP | 2460998 A1 | 6/2012 | |
| JP | 2005-226504 A | 8/2005 | |
| JP | EP 2460990 A1 * | 6/2012 | ......... B01D 53/9409 |
| JP | 5131388 B2 | 1/2013 | |
| JP | 5136694 B2 | 2/2013 | |
| WO | 2011/114498 A1 | 9/2011 | |
| WO | 2012/108059 A1 | 8/2012 | |

* cited by examiner

EXHAUST PURIFICATION SYSTEM OF INTERNAL COMBUSTION ENGINE

CROSS-REFERENCE TO RELATED APPLICATIONS

This is a national phase application based on the PCT International Patent Application No. PCT/JP2014/066917 filed Jun. 19, 2014, claiming priority to Japanese Patent Application No. 2013-165465 filed Aug. 8, 2013, the entire contents of both of which are incorporated herein by reference.

TECHNICAL FIELD

The present invention relates to an exhaust purification system of an internal combustion engine.

BACKGROUND ART

Known in the art is an internal combustion engine which arranges, in an engine exhaust passage, an exhaust purification catalyst, which arranges, downstream of the three-way catalyst in the engine exhaust passage, an $NO_X$ selective reduction catalyst, which arranges upstream of the exhaust purification catalyst in the engine exhaust passage, a hydrocarbon feed valve. A precious metal catalyst is carried on an exhaust gas flow surface of the exhaust purification catalyst and a basicity layer is formed around the precious metal catalyst. A first $NO_X$ removal method for reducing $NO_X$ contained in an exhaust gas by a reducing intermediate which is held on the basicity layer and generated by injecting hydrocarbons from the hydrocarbon feed valve within a predetermined range of period and a second $NO_X$ removal method in which an air-fuel ratio of an exhaust gas flowing into the exhaust purification catalyst is made rich by a period which is longer than said predetermined range to release and reduce $NO_X$ which is stored in the exhaust purification catalyst when the air-fuel ratio of the exhaust gas is lean are used (for example, see PTL 1).

CITATION LIST

Patent Literature

PTL 1: WO2011/114498A1

SUMMARY OF INVENTION

Technical Problem

In this internal combustion engine, when the air-fuel ratio of the exhaust gas which flows into the exhaust purification catalyst is made rich, the $NO_X$ which is stored in the exhaust purification catalyst is released and reduced. At this time, part of the released $NO_X$ is reduced and becomes ammonia which is exhausted from the exhaust purification catalyst. The ammonia which is exhausted from the exhaust purification catalyst is adsorbed at the $NO_X$ selective reduction catalyst which is arranged downstream of the exhaust purification catalyst. The ammonia which is adsorbed at the $NO_X$ selective reduction catalyst has a strong reducing power with respect to $NO_X$. Therefore, if $NO_X$ flows into the $NO_X$ selective reduction catalyst at which ammonia is adsorbed, this $NO_X$ is reduced well in the $NO_X$ selective reduction catalyst. Therefore, if the $NO_X$ selective reduction catalyst is arranged downstream of the exhaust purification catalyst, the $NO_X$ which was not removed at the exhaust purification catalyst is removed at the $NO_X$ selective reduction catalyst, therefore, a high $NO_X$ purification rate can be obtained.

In this regard, if the above-mentioned first $NO_X$ removal method is performed, part of the hydrocarbons which is fed from the hydrocarbon feed valve slips through the exhaust purification catalyst, flows to the $NO_X$ selective reduction catalyst, and deposits on the $NO_X$ selective reduction catalyst. In this regard, if the hydrocarbons deposit on the $NO_X$ selective reduction catalyst, the deposited hydrocarbons block the action of reduction of $NO_X$ by the adsorbed ammonia. As a result, even if a large amount of ammonia is adsorbed at the $NO_X$ selective reduction catalyst, the $NO_X$ selective reduction catalyst can no longer remove the $NO_X$ well. On the other hand, if the $NO_X$ selective reduction catalyst adsorbs a large amount of ammonia, so long as a large amount of hydrocarbons are not deposited on the $NO_X$ selective reduction catalyst, even if the exhaust purification catalyst does not remove almost any $NO_X$, the adsorbed ammonia can remove the $NO_X$ well at the $NO_X$ selective reduction catalyst. That is, when a large amount of ammonia is adsorbed at the $NO_X$ selective reduction catalyst, even if the action of removal of $NO_X$ by the first $NO_X$ removal method is not performed, a high $NO_X$ purification rate can be obtained. Therefore, when a large amount of ammonia is adsorbed at the $NO_X$ selective reduction catalyst, rather than using the first $NO_X$ removal method and consuming a large amount of hydrocarbons, it can be said to be preferable to stop the use of the first $NO_X$ removal method and effectively utilize the ammonia which is adsorbed at the $NO_X$ selective reduction catalyst to remove the $NO_X$. As opposed to this, when the amount of ammonia which is adsorbed at the $NO_X$ selective reduction catalyst is small, a good $NO_X$ removal action by the adsorbed ammonia cannot be expected, so at this time, it can be said to be preferable to use the first $NO_X$ removal method to remove the $NO_X$.

Solution to Problem

Therefore, in the present invention, there is provided an exhaust purification system of an internal combustion engine comprising an exhaust purification catalyst arranged in an engine exhaust passage, an $NO_X$ selective reduction catalyst arranged downstream of the exhaust purification catalyst in the engine exhaust passage, and a hydrocarbon feed valve arranged upstream of the exhaust purification catalyst in the engine exhaust passage, a precious metal catalyst is carried on an exhaust gas flow surface of the exhaust purification catalyst, a basicity layer is formed around the precious metal catalyst, a first $NO_X$ removal method for reducing $NO_X$ contained in an exhaust gas by a reducing intermediate which is held on the basicity layer and generated by injecting hydrocarbons from the hydrocarbon feed valve within a predetermined range of period and a second $NO_X$ removal method in which an air-fuel ratio of an exhaust gas flowing into the exhaust purification catalyst is made rich by a period which is longer than the predetermined range to release and reduce $NO_X$ which is stored in the exhaust purification catalyst when the air-fuel ratio of the exhaust gas is lean are used, wherein the first $NO_X$ removal method is used when an amount of ammonia which is adsorbed at the $NO_X$ selective reduction catalyst is smaller than a predetermined amount at the time of an engine operating state where the first $NO_X$ removal method should be used to remove the $NO_X$, and the first $NO_X$ removal method stops being used when the amount of ammonia which is adsorbed at the $NO_X$ selective reduction catalyst is greater than the predetermined amount at the time of an engine operating state where the first $NO_X$ removal method should be used to remove the $NO_X$.

Advantageous Effects of Invention

By stopping the use of the first $NO_X$ removal method when the amount of ammonia which is adsorbed at the $NO_X$ selective reduction catalyst is greater than a predetermined amount at the time of an engine operating state where the first $NO_X$ removal method should be used to remove $NO_X$, it is possible to reduce the amount of consumption of hydrocarbons while effectively utilizing the ammonia which is adsorbed at the $NO_X$ selective reduction catalyst to remove $NO_X$.

DESCRIPTION OF EMBODIMENTS

Figure 1:
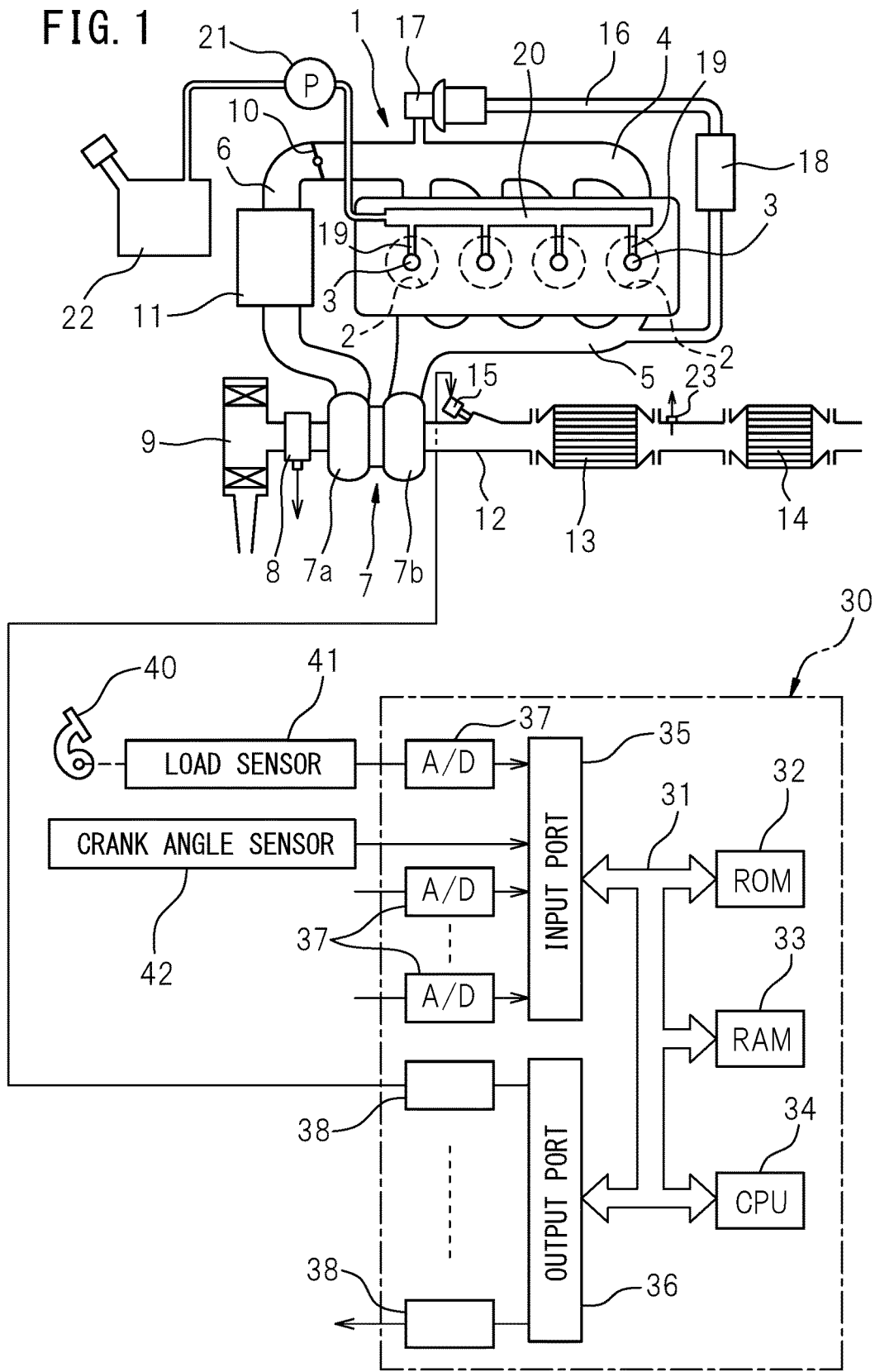
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_X$ storage catalyst 13. An outlet of the exhaust purification catalyst 13 is connected to an $NO_X$ selective reducing catalyst 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust gas flowing out from the exhaust purification catalyst 13, and the output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
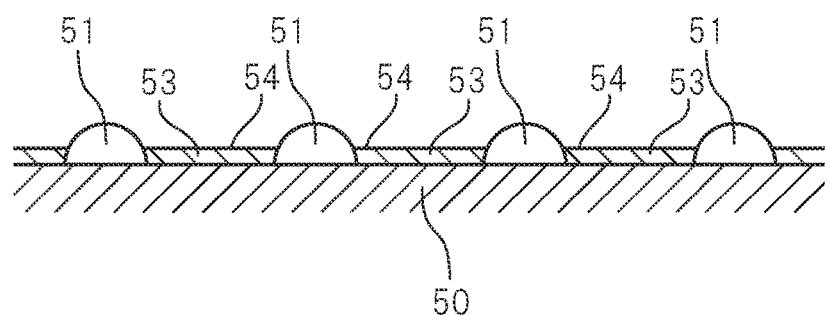
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
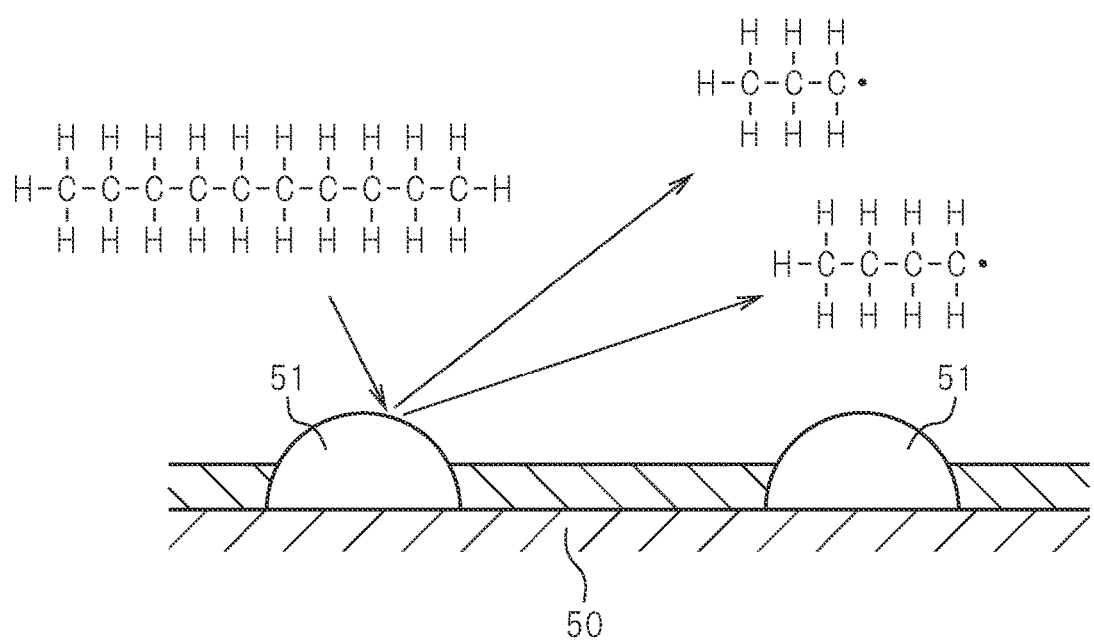
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
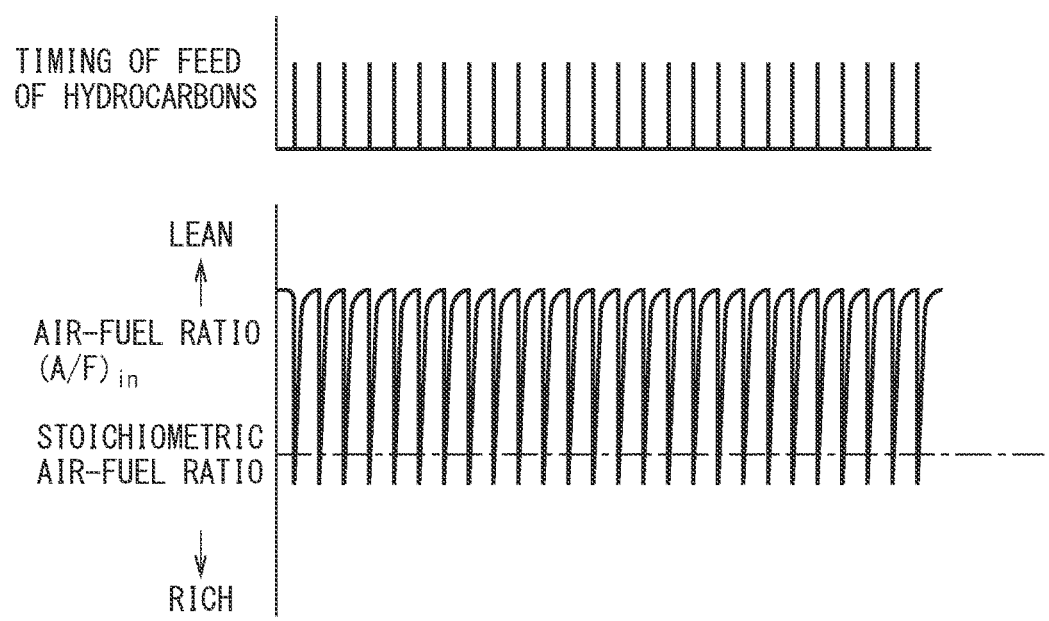
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the change in the air-fuel ratio (A/F)in depends on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
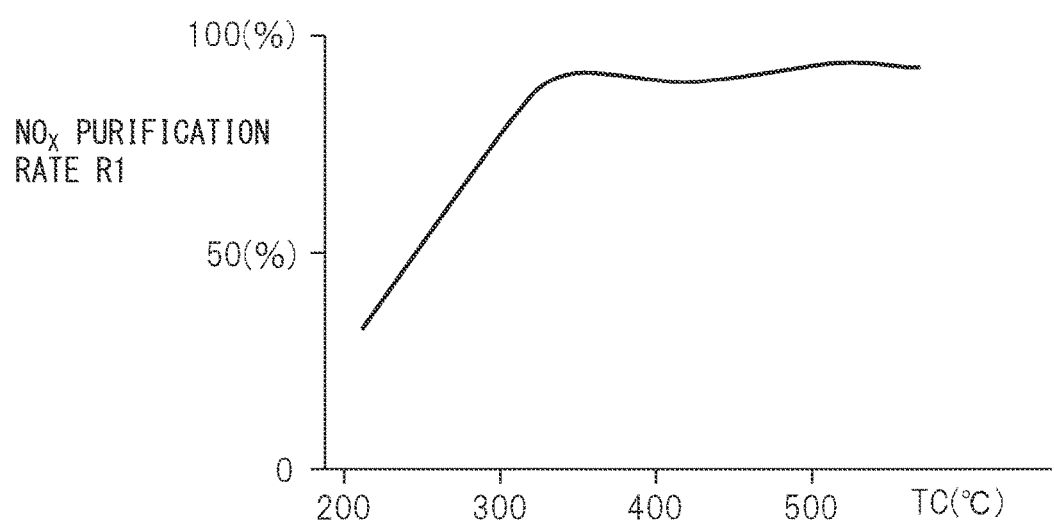
FIG. 5 is a view which shows an $NO_X$ purification rate R1.

FIG. 5 shows the $NO_X$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F)in of the exhaust gas flowing to the exhaust purification catalyst 13 rich. In this regard, as a result of a research relating to $NO_X$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate R1 is obtained even in a 350° C. or higher high temperature region.

Figure 6A:
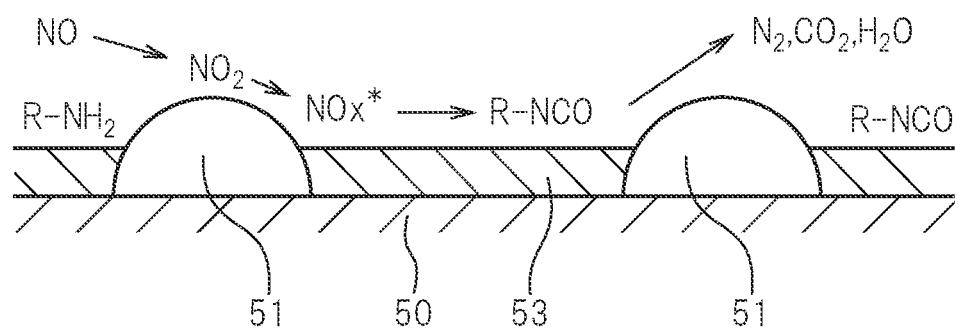
FIGS. 6A and 6B are views for explaining an oxidation reduction reaction in an exhaust purification catalyst.
Figure 6B:
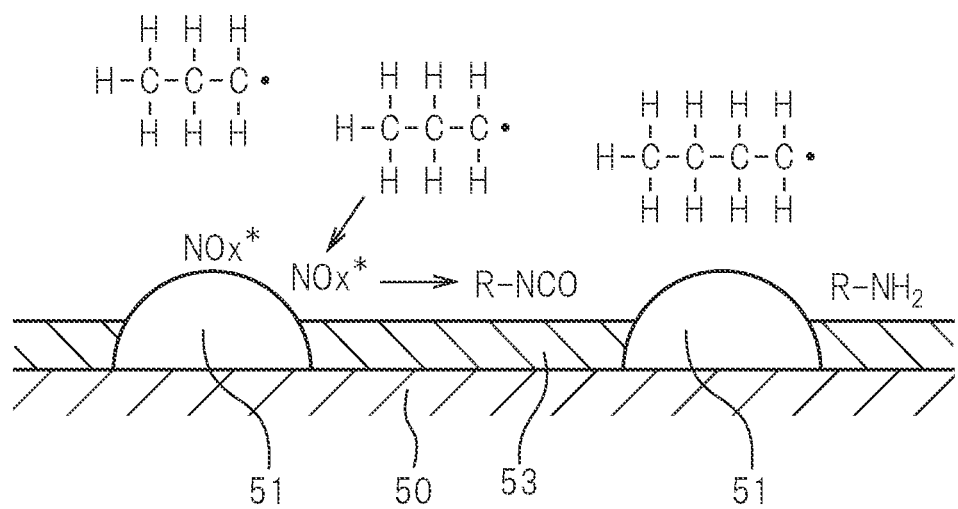

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F)in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15 and the air-fuel ratio (A/F)in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X$ becomes higher. In this regard, if, after the active $NO_X$ is produced, the state of a high oxygen concentration around the active $NO_X^*$ continues for a constant time or more, the active $NO_X^*$is oxidized and is absorbed in the form of nitrate ions $NO_3^-$ inside the basic layer 53. However, if, before this constant time elapses, the hydrocarbon concentration around the active $NO_X^*$becomes higher, as shown in FIG. 6B, the active $NO_X^*$reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—NH$_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the NO$_X$ in the exhaust gas, react with the active NO$_X$, react with the surrounding oxygen, or break down on their own. Due to this, the reducing intermediates R—NCO and R—NH$_2$ are converted to N$_2$, CO$_2$, and H$_2$O as shown in FIG. 6A, therefore the NO$_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the NO$_X$ in the exhaust gas or the active NO$_X$* or oxygen or break down on their own whereby the NO$_X$ is removed. That is, in order for the exhaust purification catalyst 13 to remove the NO$_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the NO$_X$ in the exhaust gas or the active NO$_X$* or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—NH$_2$ react with the NO$_X$ in the exhaust gas or the active NO$_X$* or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active NO$_X$* is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the NO$_X$ contained in the exhaust gas and the reformed hydrocarbons and produce the reducing intermediates R—NCO and R—NH$_2$ containing nitrogen and hydrocarbons, the precious metal catalysts 51 are carried on the exhaust gas flow surfaces of the exhaust purification catalyst 13. To hold the produced reducing intermediates R—NCO and R—NH$_2$ inside the exhaust purification catalyst 13, the basic layers 53 are formed around the precious metal catalysts 51. The reducing intermediates R—NCO and R—NH$_2$ which are held on the basic layer 53 are converted to N$_2$, CO$_2$, and H$_2$O. The vibration period of the hydrocarbon concentration is made the vibration period required for continuation of the production of the reducing intermediates R—NCO and R—NH$_2$. Incidentally, in the example shown in FIG. 4, the injection interval is made 3 seconds.

Figure 7A:
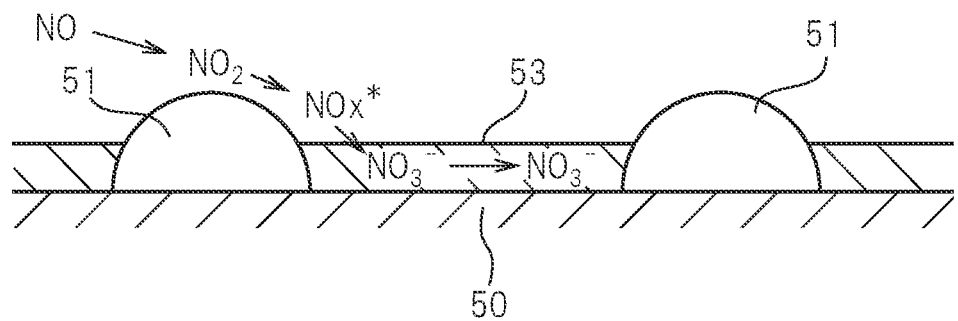
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—NH$_2$ disappear from the surface of the basic layer 53. At this time, the active NO$_X$* which is produced on the platinum Pt 53, as shown in FIG. 7A, diffuses in the basic layer 53 in the form of nitrate ions NO$_3^-$ and becomes nitrates. That is, at this time, the NO$_X$ in the exhaust gas is absorbed in the form of nitrates inside of the basic layer 53.

Figure 7B:
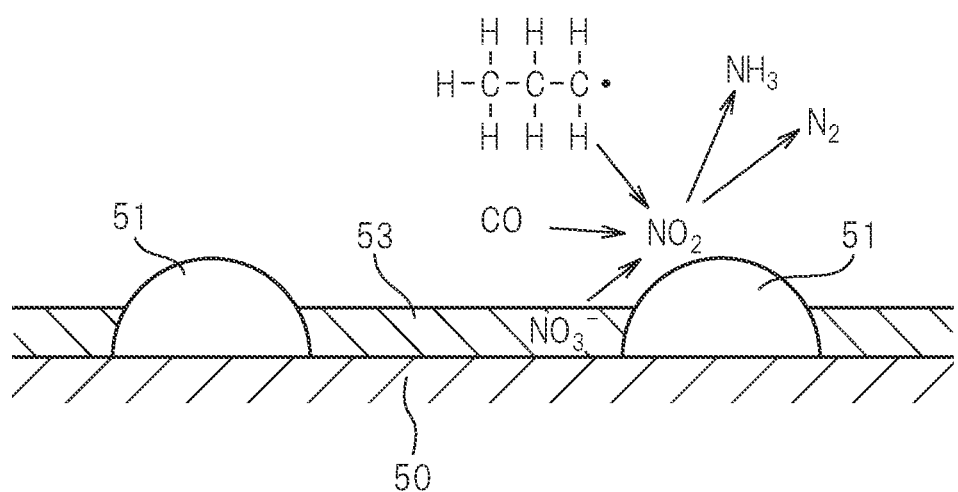

On the other hand, FIG. 7B shows the case where the air-fuel ratio of the exhaust gas which flows into the exhaust purification catalyst 13 is made rich when the NO$_X$ is absorbed in the form of nitrates inside of the basic layer 53. In this case, the oxygen concentration in the exhaust gas falls, so the reaction proceeds in the opposite direction (NO$_3^- \rightarrow$ NO$_2$), and consequently the nitrates absorbed in the basic layer 53 successively become nitrate ions NO$_3^-$ and, as shown in FIG. 7B, are released from the basic layer 53 in the form of NO$_2$. Next, the released NO$_2$ is reduced by the hydrocarbons HC and CO contained in the exhaust gas, and a part of the released NO$_2$ becomes an ammonia NH$_3$. In this way, in the embodiment according to the present invention, when the air-fuel ratio of the exhaust gas which flows into the exhaust purification catalyst 13 is made rich, an ammonia is produced in the exhaust purification catalyst 13. The ammonia produced in the exhaust purification catalyst 13 flows into the NO$_X$ selective reducing catalyst 14 and is adsorbed on the NO$_X$ selective reducing catalyst 14.

Figure 8:
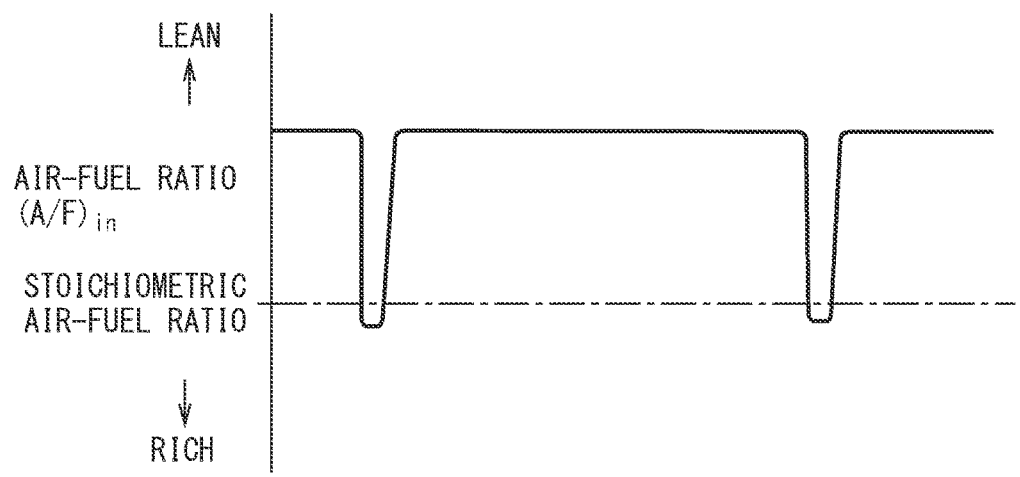
FIG. 8 is a view which shows changes in an air-fuel ratio of exhaust gas which flows into an exhaust purification catalyst.

FIG. 8 shows the case of making the air-fuel ratio (A/F)in of the exhaust gas which flows into the exhaust purification catalyst 13 temporarily rich slightly before the NO$_X$ absorption ability of the basic layer 53 becomes saturated. Note that, in the example shown in FIG. 8, the time interval of this rich control is 1 minute or more. In this case, the NO$_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing NO$_X$.

Note that, at this time, sometimes the basic layer 53 temporarily adsorbs the NO$_X$. Therefore, if using term of "storage" as a term including both "absorption" and "adsorption", at this time, the basic layer 53 performs the role of an NO$_X$ storage agent for temporarily storing the NO$_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an NO$_X$ storage catalyst which stores the NO$_X$ when the air-fuel ratio of the exhaust gas is lean and releases the stored NO$_X$ when the oxygen concentration in the exhaust gas falls.

Figure 9:
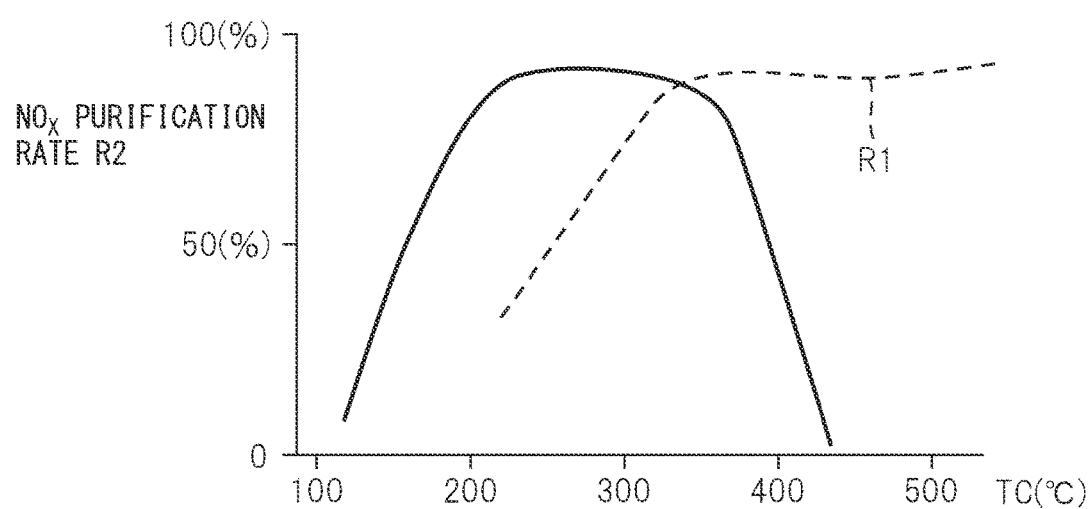
FIG. 9 is a view which shows an $NO_X$ purification rate R2.

The solid line of FIG. 9 shows the NO$_X$ purification rate R2 when making the exhaust purification catalyst 13 function as an NO$_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 250° C. to 300° C., an extremely high $NO_X$ purification rate is obtained, but when the catalyst temperature TC becomes a 350° C. or higher high temperature, the $NO_X$ purification rate R2 falls. Note that, in FIG. 9, the $NO_X$ purification rate R1 shown in FIG. 5 is illustrated by the broken line.

In this way, when the catalyst temperature TC becomes 350° C. or more, the $NO_X$ purification rate R2 falls because if the catalyst temperature TC becomes 350° C. or more, $NO_X$ is less easily stored and the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate R2. However, in the new $NO_X$ purification method shown from FIG. 4 to FIGS. 6A and 6B, the amount of $NO_X$ stored in the form of nitrates is small, and consequently, as shown in FIG. 5, even when the catalyst temperature TC is high, a high $NO_X$ purification rate R1 is obtained.

In the embodiment according to the present invention, to be able to purify $NO_X$ by using this new $NO_X$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, the basic layers 53 are formed around the precious metal catalysts 51, the exhaust purification catalyst 13 has the property of reducing the $NO_X$ contained in exhaust gas by the reducing intermediates which are held on the basic layers 53 if hydrocarbons are injected from the hydrocarbon feed valve 15 within a predetermined range of period and has the property of being increased in storage amount of $NO_X$ contained in exhaust gas if making the injection period of the hydrocarbon from the hydrocarbon feed valve 15 longer than this predetermined range, and, at the time of engine operation, the hydrocarbons are injected from the hydrocarbon feed valve 15 within the predetermined range of period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification method designed to remove $NO_X$ without forming so much nitrates in the case of using an exhaust purification catalyst which carries precious metal catalysts and forms a basic layer which can absorb $NO_X$. In actuality, when using this new $NO_X$ purification method, the nitrates which are detected from the basic layer 53 are smaller in amount compared with the case where making the exhaust purification catalyst 13 function as an $NO_X$ storage catalyst. Note that, this new $NO_X$ purification method will be referred to below as the "first $NO_X$ purification method".

Figure 10:
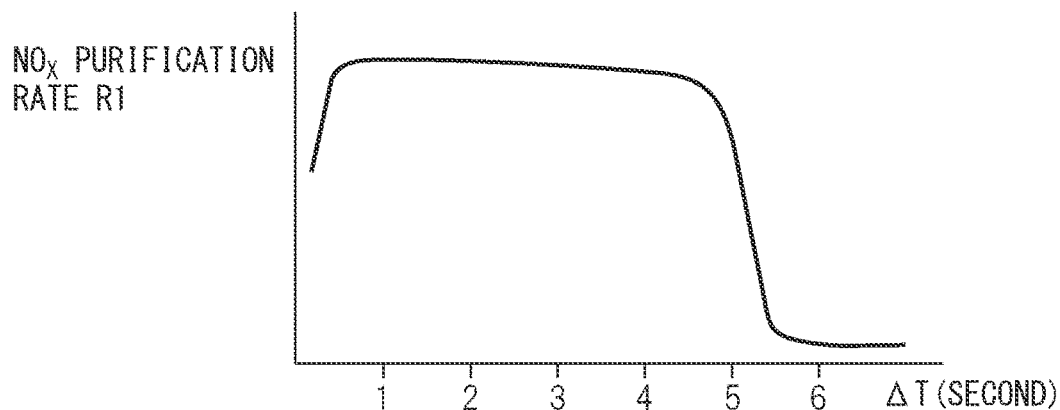
FIG. 10 is a view which shows a relationship between a vibration period $\Delta T$ of hydrocarbon concentration and an $NO_X$ purification rate R1.

Now, as mentioned before, if the injection period $\Delta T$ of the hydrocarbons from the hydrocarbon feed valve 15 becomes longer, the time period in which the oxygen concentration around the active $NO_X{}^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_X{}^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_X$ purification rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_X$ purification rate R1 falls. Therefore, in the embodiment according to the present invention, the injection period of the hydrocarbons is made from 0.3 second to 5 seconds.

Figure 11A:
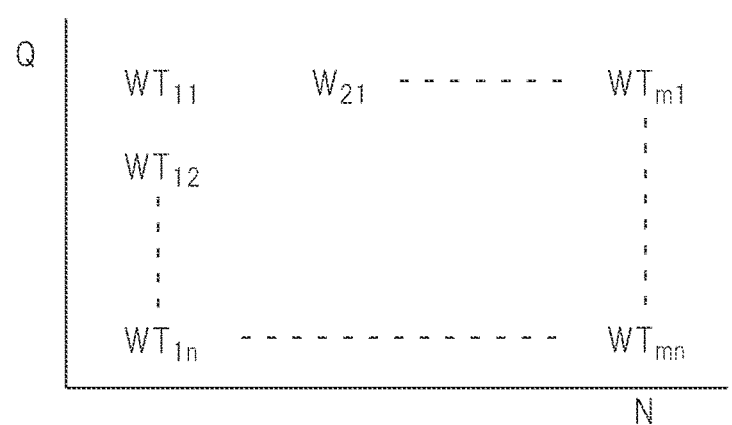
FIGS. 11A and 11B are views which show maps of the injection amount of hydrocarbons etc.
Figure 11B:
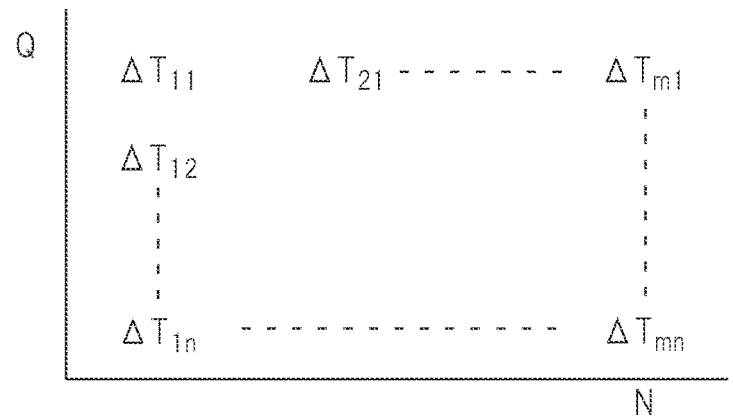

In the embodiment according to the present invention, the injection amount and injection timing of hydrocarbons from the hydrocarbon feed valve 15 which are optimum for ensuring a good $NO_X$ purification action by the first $NO_X$ purification method are obtained in advance. In this case, in the embodiment according to the present invention, the optimum hydrocarbon injection amount WT when the $NO_X$ purification action by the first $NO_X$ purification method is performed is stored as a function of the injection amount Q from fuel injectors 3 and the engine speed N in the form of a map such as shown in FIG. 11A in advance in the ROM 32. Further, the optimum injection period $\Delta T$ of the hydrocarbons at this time is also stored as a function of the injection amount Q from the fuel injectors 3 and the engine speed N in the form of a map such as shown in FIG. 11B in advance in the ROM 32.

Next, referring to FIG. 12 to FIG. 15, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 12:
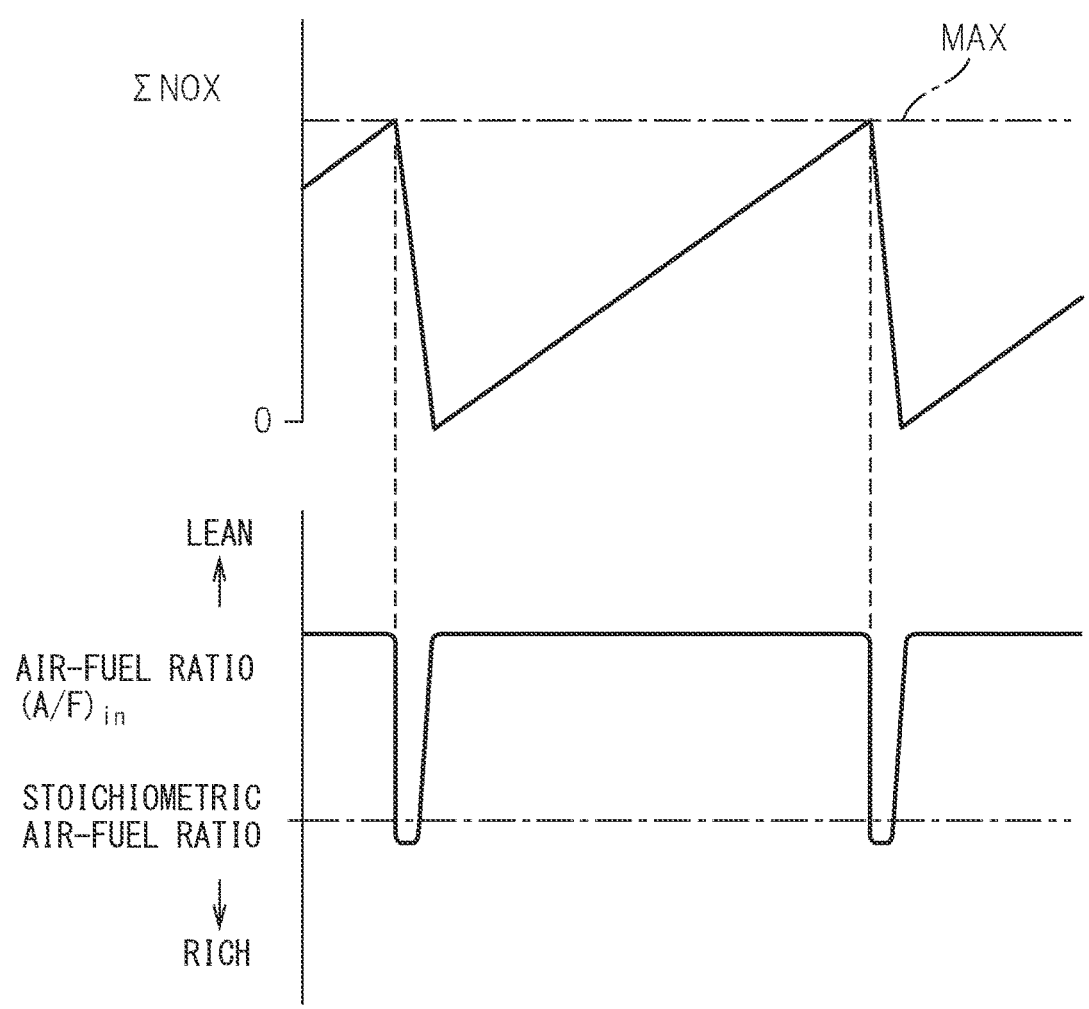
FIG. 12 is a view which shows an $NO_X$ release control.

In this second $NO_X$ purification method, as shown in FIG. 12, when the stored $NO_X$ amount $\Sigma NO_X$ of $NO_X$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_X$ which was stored in the basic layer 53 when the air-fuel ratio (A/F)in of the exhaust gas was lean is released from the basic layer 53 all at once and reduced. Due to this, the $NO_X$ is removed.

Figure 13:
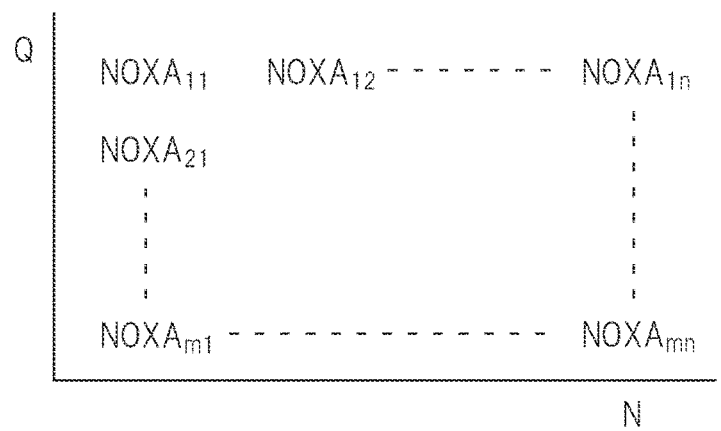
FIG. 13 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 13 in advance in the ROM 32. The stored $NO_X$ amount $\Sigma NO_X$ is calculated from this exhausted $NO_X$ amount NOXA. In this case, as explained before, the period at which the air-fuel ratio (A/F)in of the exhaust gas is made rich is usually 1 minute or more.

Figure 14:
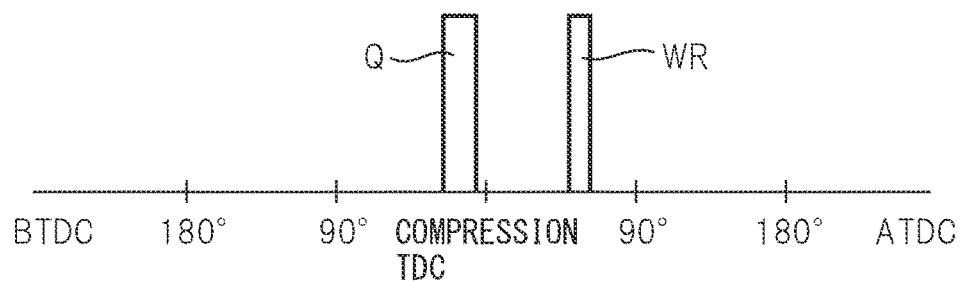
FIG. 14 is a view which shows a fuel injection timing.
Figure 15:
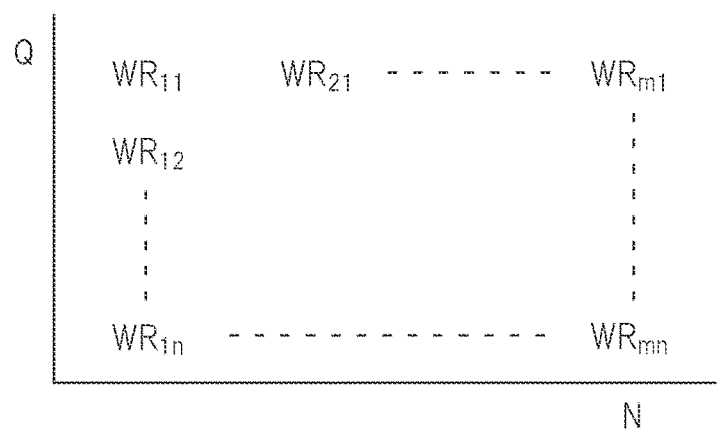
FIG. 15 is a view which shows a map of an additional hydrocarbon feed amount WR.

In this second $NO_X$ purification method, as shown in FIG. 14, by injecting an additional fuel WR into each combustion chamber 2 from the fuel injector 3 in addition to the combustion-use fuel Q, the air-fuel ratio (A/F)in of the exhaust gas which flows into the exhaust purification catalyst 13 is made rich. Note that, in FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 15 in advance in the ROM 32. Of course, in this case, it is also possible to make the injection amount of hydrocarbons from the hydrocarbon feed valve 15 increase so as to make the air-fuel ratio (A/F)in of the exhaust gas rich.

Now then, as will be understood if comparing the $NO_X$ purification rate R1 by the first $NO_X$ removal method which is shown in FIG. 5 and FIG. 9 and the $NO_X$ purification rate R2 by the second $NO_X$ removal method which is shown in FIG. 9, when the catalyst temperature TC is relatively low, the $NO_X$ purification rate R2 by the second $NO_X$ removal method becomes higher, while when the catalyst temperature TC becomes higher, the $NO_X$ purification rate R1 by the first $NO_X$ removal method becomes higher. Therefore, in an embodiment according to the present invention, generally speaking, when the catalyst temperature TC is low, the second $NO_X$ removal method is used, while when the catalyst temperature TC is high, the first $NO_X$ removal method is used.

Figure 16A:
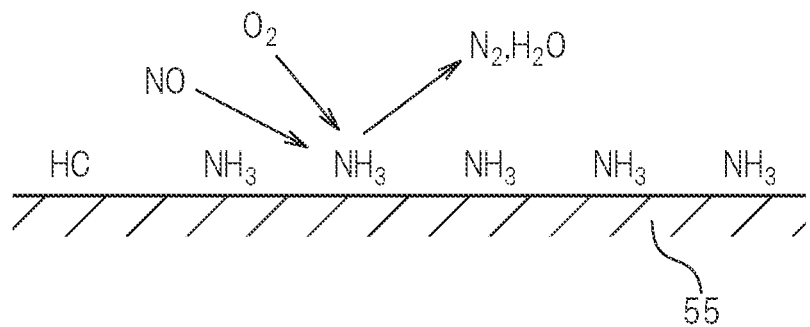
FIGS. 16A, 16B and 16C are views for explaining an oxidation reduction reaction in an $NO_X$ selective reducing catalyst.
Figure 16B:
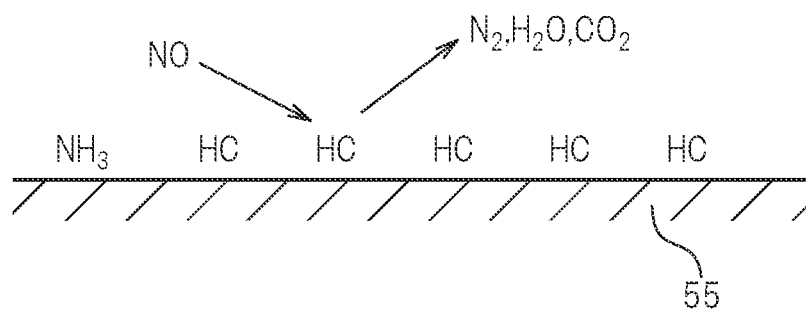
Figure 16C:
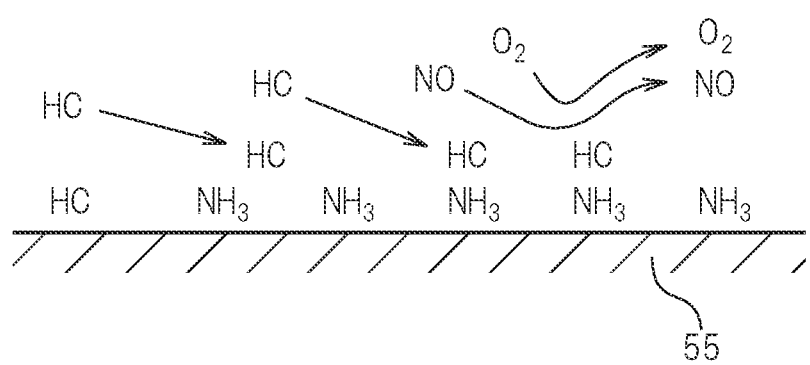

Next, the $NO_X$ selective reduction catalyst 14 which is shown in FIG. 1 will be explained. The $NO_X$ selective reduction catalyst 14 is, for example, comprised of Fe zeolite. If the exhaust gas contains ammonia $NH_3$ or hydrocarbons, these ammonia $NH_3$ and hydrocarbons are adsorbed at the $NO_X$ selective reduction catalyst 14. If the exhaust gas contains $NO_X$, this $NO_X$ is reduced by the ammonia $NH_3$ and hydrocarbons which are adsorbed at the $NO_X$ selective reduction catalyst 14. However, in this case, when the $NO_X$ selective reduction catalyst 14 has adsorbed ammonia $NH_3$, a problem is caused if hydrocarbons flow into the $NO_X$ selective reduction catalyst 14. Next, this will be explained while referring to FIGS. 16A, 16B, and 16C. Note that, these FIGS. 16A, 16B and 16C schematically show the surface part of the catalyst carrier 55 of the $NO_X$ selective reduction catalyst 14. These FIGS. 16A, 16B, and 16C show the reactions which are believed to occur on the catalyst carrier 55 of the $NO_X$ selective reduction catalyst 14.

As explained above, if the air-fuel ratio of the exhaust gas which flows into the exhaust purification catalyst 13 is made rich, the exhaust purification catalyst 13 generates ammonia $NH_3$. The ammonia $NH_3$ which is generated at this time flows into the $NO_X$ selective reduction catalyst 14 and, as shown in FIG. 16A, is adsorbed at the $NO_X$ selective reduction catalyst 14. The $NO_X$ which is contained in the exhaust gas, as shown in FIG. 16A, is reduced by the ammonia $NH_3$ which is adsorbed on the $NO_X$ selective reduction catalyst 14 in the presence of oxygen and removed. Therefore, even if the $NO_X$ which could not be removed by the exhaust purification catalyst 13 is exhausted from the exhaust purification catalyst 13, this $NO_X$ is removed at the $NO_X$ selective reduction catalyst 14. FIG. 16A shows the case where a large amount of ammonia $NH_3$ is adsorbed at the $NO_X$ selective reduction catalyst 14. The ammonia which is adsorbed at the $NO_X$ selective reduction catalyst has a strong reducing power against $NO_X$. Therefore, as shown in FIG. 16A, when a large amount of ammonia $NH_3$ is adsorbed at the $NO_X$ selective reduction catalyst 14, when the action of removal of $NO_X$ is performed at the exhaust purification catalyst 13 of course and also when the action of removal of $NO_X$ is not performed at the exhaust purification catalyst 13, the $NO_X$ which is contained in the exhaust gas is removed extremely well in the $NO_X$ selective reduction catalyst 14.

FIG. 16B shows when the first $NO_X$ removal method is being used. When the first $NO_X$ removal method is being used, hydrocarbons are periodically injected from the hydrocarbon feed valve 15. At this time, part of the hydrocarbons which are injected from the hydrocarbon feed valve 15 slip through the exhaust purification catalyst 13 and are exhausted from the exhaust purification catalyst 13. The hydrocarbons which are exhausted from the exhaust purification catalyst 13 flow into the $NO_X$ selective reduction catalyst 14 and are adsorbed at the $NO_X$ selective reduction catalyst 14 as shown in FIG. 16B. The $NO_X$ which is contained in the exhaust gas, as shown in FIG. 16B, is reduced by the hydrocarbons which are adsorbed on the $NO_X$ selective reduction catalyst 14 and removed. Therefore, even if the $NO_X$ which could not be removed at the exhaust purification catalyst 13 was exhausted from the exhaust purification catalyst 13, this $NO_X$ is removed at the $NO_X$ selective reduction catalyst 14. Note that, the reducing power of $NO_X$ by the hydrocarbons which are adsorbed at the $NO_X$ selective reduction catalyst 14 is weaker than the reducing power of $NO_X$ by the ammonia $NH_3$ which is adsorbed at the $NO_X$ selective reduction catalyst 14.

On the other hand, FIG. 16C shows the case where, as shown in FIG. 16A, when a large amount of ammonia $NH_3$ is adsorbed at the $NO_X$ selective reduction catalyst 14, the first $NO_X$ removal method is used and, at this time, the hydrocarbons which slip through the exhaust purification catalyst 13 flow into the $NO_X$ selective reduction catalyst 14. In this way, when a large amount of ammonia $NH_3$ is adsorbed at the $NO_X$ selective reduction catalyst 14, if hydrocarbons flow into the $NO_X$ selective reduction catalyst 14, the hydrocarbons, as shown in FIG. 16C, deposit on the $NO_X$ selective reduction catalyst 14. In this regard, if hydrocarbons deposit on the $NO_X$ selective reduction catalyst 14, the deposited hydrocarbons block the action of reduction of $NO_X$ by the adsorbed ammonia $NH_3$. As a result, as will be understood from FIG. 16C, even if a large amount of ammonia is adsorbed at the $NO_X$ selective reduction catalyst 14, the $NO_X$ selective reduction catalyst 14 can no longer remove $NO_X$ well.

On the other hand, as shown in FIG. 16A, when a large amount of ammonia $NH_3$ is adsorbed at the $NO_X$ selective reduction catalyst 14, so long as a large amount of hydrocarbons are not deposited on the $NO_X$ selective reduction catalyst 14, even if the exhaust purification catalyst 13 does not remove almost any $NO_X$, the adsorbed ammonia $NH_3$ can be used to remove the $NO_X$ at the $NO_X$ selective reduction catalyst 14. That is, when a large amount of ammonia is adsorbed at the $NO_X$ selective reduction catalyst 14, a high $NO_X$ purification rate can be obtained even without the action of removal of $NO_X$ by the first $NO_X$ removal method. Therefore, when a large amount of ammonia $NH_3$ is adsorbed at the $NO_X$ selective reduction catalyst 14, rather than use the first $NO_X$ removal method and consume a large amount of hydrocarbons, it can be said to be preferable to stop using the first $NO_X$ removal method and effectively utilize the ammonia which is adsorbed at the $NO_X$ selective reduction catalyst 14 to remove the $NO_X$. As opposed to this, when the amount of ammonia adsorbed at the $NO_X$ selective reduction catalyst 14 is small, a good action of removal of $NO_X$ by the adsorbed ammonia $NH_3$ cannot be expected, so, at this time, it can be said to be preferable to use the first $NO_X$ removal method to remove the $NO_X$. Note that, in this case as well, as shown in FIG. 16B, the $NO_X$ which could not be removed at the exhaust purification catalyst 13 is removed by the hydrocarbons which are adsorbed at the $NO_X$ selective reduction catalyst 14.

Therefore, in the present invention, in an exhaust purification system of an internal combustion engine comprising an exhaust purification catalyst 13 arranged in an engine exhaust passage, an $NO_X$ selective reduction catalyst 14 arranged downstream of the exhaust purification catalyst 13 in the engine exhaust passage, and a hydrocarbon feed valve 15 arranged upstream of the exhaust purification catalyst 13 in the engine exhaust passage, a precious metal catalyst 51 is carried on an exhaust gas flow surface of the exhaust purification catalyst 13, a basicity layer 53 is formed around the precious metal catalyst 51, a first $NO_X$ removal method for reducing $NO_X$ contained in an exhaust gas by a reducing intermediate which is held on the basicity layer 53 and generated by injecting hydrocarbons from the hydrocarbon feed valve 15 within a predetermined range of period and a second $NO_X$ removal method in which an air-fuel ratio of an exhaust gas flowing into the exhaust purification catalyst 13 is made rich by a period which is longer than the above mentioned predetermined range to release and reduce $NO_X$ which is stored in the exhaust purification catalyst 13 when the air-fuel ratio of the exhaust gas is lean are used, the first $NO_X$ removal method is used when an amount of ammonia which is adsorbed at the $NO_X$ selective reduction catalyst 14 is smaller than a predetermined amount at the time of an engine operating state where the first $NO_X$ removal method should be used to remove the $NO_X$, and the first $NO_X$ removal method stops being used when the amount of ammonia which is adsorbed at the $NO_X$ selective reduction catalyst 14 is greater than the predetermined amount at the time of an engine operating state where the first $NO_X$ removal method should be used to remove the $NO_X$.

In this way, in the present invention, at the time of the engine operating state where the first $NO_X$ removal method should be used to remove the $NO_X$, it is determined whether to perform the first $NO_X$ removal method in accordance with the amount of ammonia which is adsorbed at the $NO_X$ selective reduction catalyst 14. In this regard, as explained above, in an embodiment according to the present invention, generally speaking, when the exhaust purification catalyst 13 is low in temperature TC, the second $NO_X$ removal method is used, while when the exhaust purification catalyst 13 is high in temperature TC, the first $NO_X$ removal method is used. If giving a specific example, for example, if the temperature TC of the exhaust purification catalyst 13 exceeds a predetermined temperature, the $NO_X$ removal method is switched from the second $NO_X$ removal method to the first $NO_X$ removal method. In the case of this example, the state when the temperature TC of the exhaust purification catalyst 13 exceeds the predetermined temperature and thus the $NO_X$ removal method is made the first $NO_X$ removal method is, in the parlance of the present invention, the engine operating state where first $NO_X$ removal method should be used to remove $NO_X$.

Further, in the present invention, it is determined whether to perform the first $NO_X$ removal method in accordance with whether the amount of ammonia which is adsorbed at the $NO_X$ selective reduction catalyst 14 is larger than a predetermined amount. In this case, in an embodiment according to the present invention, calculating means is provided for calculating the amount of ammonia which is adsorbed at the $NO_X$ selective reduction catalyst 14. When the amount of ammonia which is calculated by this calculating means is smaller than a predetermined amount at the time of an engine operating state where the first $NO_X$ removal method should be used to remove the $NO_X$, the first $NO_X$ removal method is used, while when the amount of ammonia which is calculated by this calculating means is greater than a predetermined amount at the time of an engine operating state where the first $NO_X$ removal method should be used to remove the $NO_X$, the first $NO_X$ removal method stops being used. In this case, in an embodiment according to the present invention, the electronic control unit 30 constitutes this calculating means.

Figure 17A:
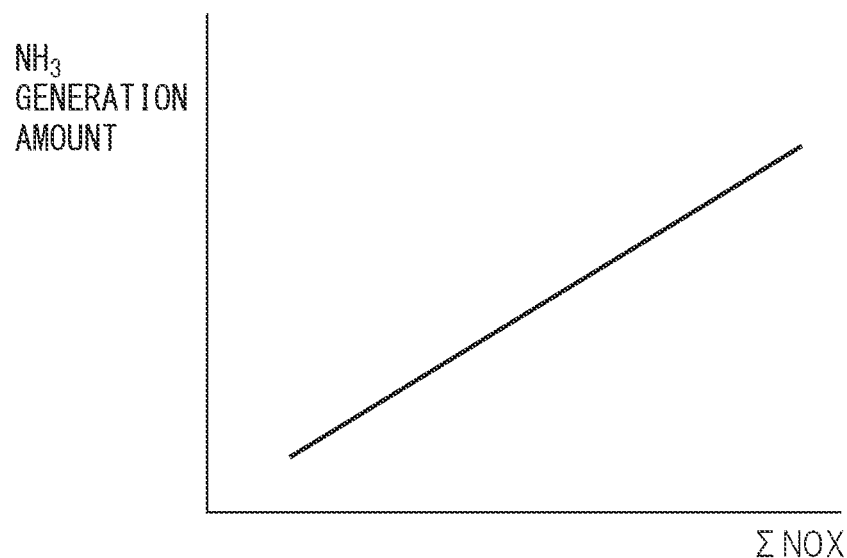
FIGS. 17A and 17B are views which show a generation amount of ammonia.

Next, the method of calculation of the amount of adsorbed ammonia based on this calculating means will be explained while referring to FIG. 17A and FIG. 17B. As explained above, if the air-fuel ratio of the exhaust gas which flows into the exhaust purification catalyst 13 is made rich, ammonia $NH_3$ is generated at the exhaust purification catalyst 13. This generated ammonia $NH_3$ is adsorbed at the $NO_X$ selective reduction catalyst 14. FIG. 17A shows the relationship between the amount of generation of ammonia which is generated at the exhaust purification catalyst 13 when the air-fuel ratio of the exhaust gas flowing into the exhaust purification catalyst 13 is made rich and the amount $\Sigma NOX$ of stored $NO_X$ which is stored at the basicity layer 53 of the exhaust purification catalyst 13, while FIG. 17B shows the relationship between the amount of generation of ammonia which is generated at the exhaust purification catalyst 13 when the air-fuel ratio of the exhaust gas flowing into the exhaust purification catalyst 13 is made rich and the air-fuel ratio at this time.

Figure 17B:
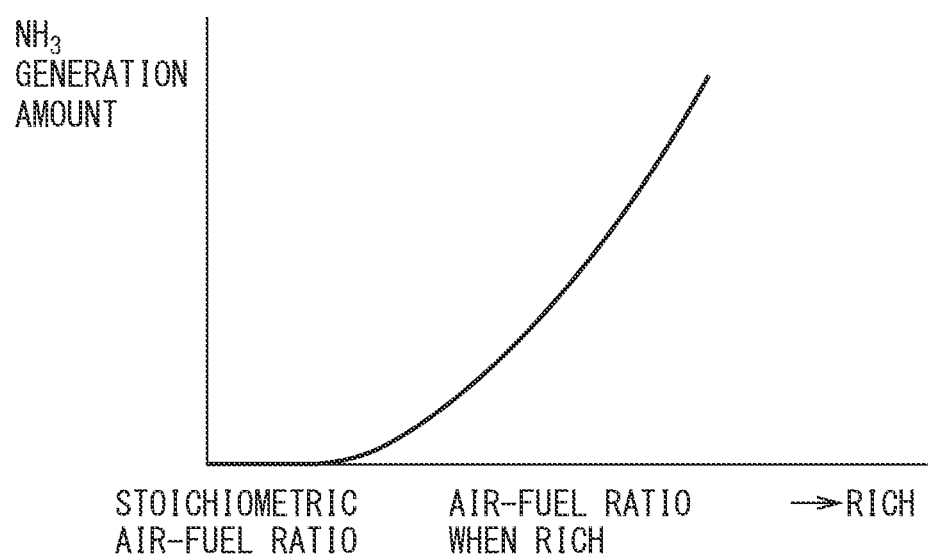

As shown in FIG. 17A, the amount of generation of ammonia which is generated at the exhaust purification catalyst 13 when the air-fuel ratio of the exhaust gas flowing into the exhaust purification catalyst 13 is made rich increases the greater the stored $NO_X$ amount $\Sigma NOX$, while as shown in FIG. 17B, the amount of generation of ammonia which is generated at the exhaust purification catalyst 13 when the air-fuel ratio of the exhaust gas which flowing into the exhaust purification catalyst 13 is made rich increases the smaller the air-fuel ratio of the exhaust gas at this time, that is, the smaller the richness degree. In an embodiment according to the present invention, when the air-fuel ratio of the exhaust gas flowing into the exhaust purification catalyst 13 is made rich, the amount of generation of ammonia $NH_3$ is calculated based on FIG. 17A and FIG. 17B and the amount of generation of this ammonia $NH_3$ is made the amount of ammonia which is newly adsorbed at the $NO_X$ selective reduction catalyst 14.

Further, in the present invention, the amount of ammonia which is adsorbed at the $NO_X$ selective reduction catalyst 14 and a predetermined amount are compared. In this case, in the present invention, this predetermined amount WX is found based on experiments. This predetermined amount WX is an amount by which, even if stopping the action of removal of $NO_X$ by the first $NO_X$ removal method, the ammonia $NH_3$ which is adsorbed at the $NO_X$ selective reduction catalyst 14 is enough to be able to reduce the $NO_X$ in the exhaust gas which flows into the $NO_X$ selective reduction catalyst 14.

Figure 18:
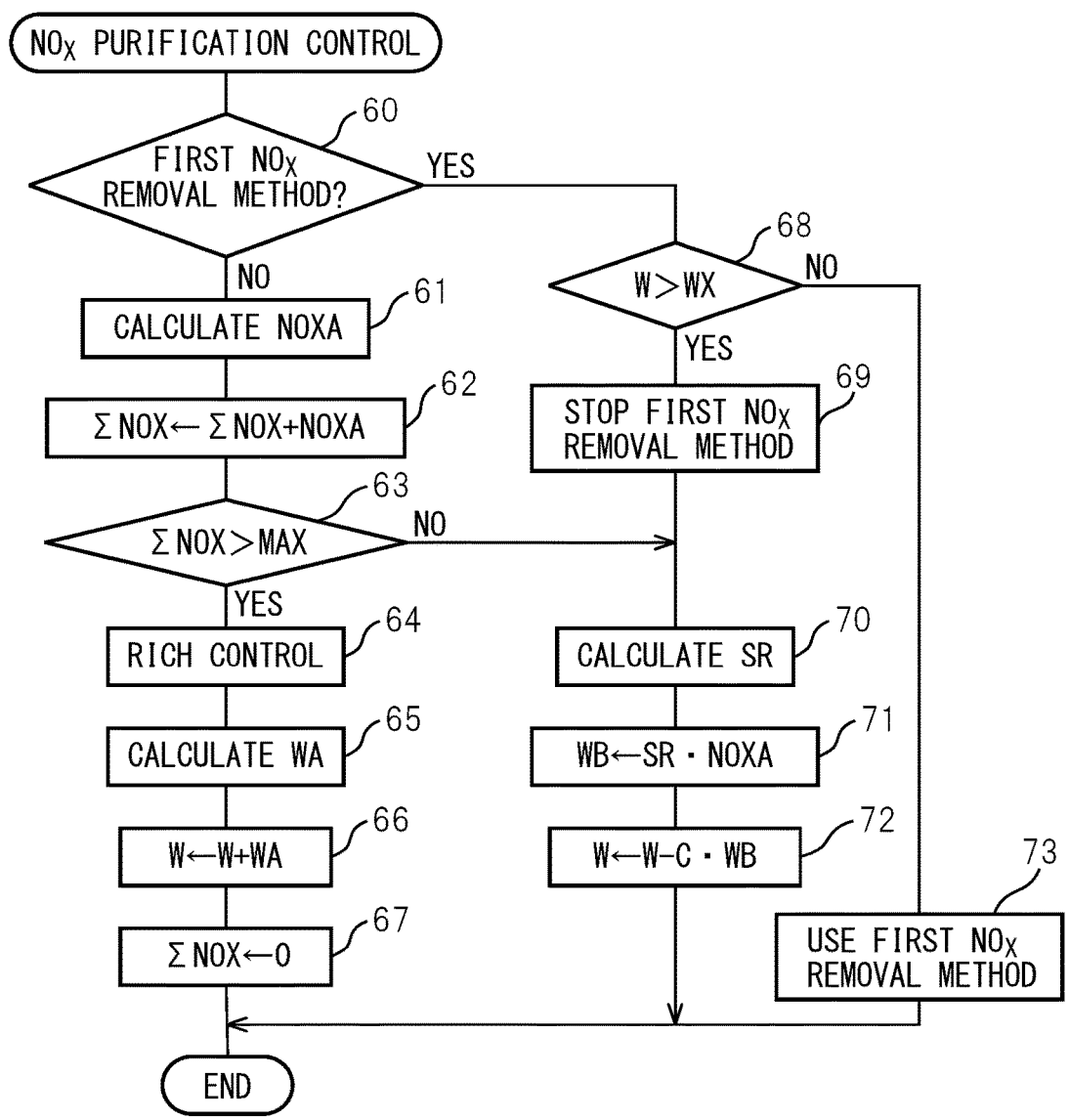
FIG. 18 is a flow chart for performing an $NO_X$ purification control.

FIG. 18 shows the $NO_X$ purification control routine. This routine is executed by interruption every predetermined time.

Referring to FIG. 18, first, at step 60, it is judged if the engine operating state is one where first $NO_X$ removal method should be used to remove $NO_X$. When judged not to be an engine operating state where first $NO_X$ removal method should be used to remove $NO_X$, the routine proceeds to step 61 where the $NO_X$ removal action by the second $NO_X$ removal method is performed. That is, at step 61, the amount NOXA of $NO_X$ which is exhausted per unit time is calculated from the map which is shown in FIG. 13, next, at step 62, the amount NOXA of $NO_X$ which is exhausted per unit time is added to ΣNOX to calculate the stored $NO_X$ amount ΣNOX. Next, at step 63, it is judged if the stored $NO_X$ amount ΣNOX exceeds the allowable value MAX.

When the stored $NO_X$ amount ΣNOX does not exceed the allowable value MAX, the routine proceeds to step 70 where the $NO_X$ slip through rate SR(=(100−R2)/100) at the exhaust purification catalyst 13 is calculated from the $NO_X$ purification rate R2 when the second $NO_X$ removal method is being used which is shown in FIG. 9 based on the temperature TC of the exhaust purification catalyst 13. Next, at step 71, the exhausted $NO_X$ amount NOXA is multiplied with the $NO_X$ slip through rate SR to thereby calculate the amount WB of $NO_X$ which flows into the $NO_X$ selective reduction catalyst 14 per unit time. Next, at step 72, the amount of ammonia which is consumed per unit time for reducing the $NO_X$ which flows into the $NO_X$ selective reduction catalyst 14 is found by multiplying the $NO_X$ amount WB with a constant C. This amount of ammonia C·WB which is consumed per unit time is subtracted from the amount W of adsorbed ammonia to calculate the amount W of adsorbed ammonia which is adsorbed at the $NO_X$ selective reduction catalyst 14.

As opposed to this, when it is judged at step 63 that the stored $NO_X$ amount ΣNOX exceeds the allowable value MAX, the routine proceeds to step 64 where an additional fuel amount WR is calculated from the map which is shown in FIG. 15 and the action of injection of additional fuel from the fuel injector 3 is performed. At this time, the air-fuel ratio of the exhaust gas which flows into the exhaust purification catalyst 13 is temporarily made rich. Next, at step 65, based on the relationships which are shown in FIG. 17A and FIG. 17B, the amount WA of generation of ammonia which is generated at the exhaust purification catalyst 13 at this time is calculated. Next, at step 66, this ammonia generation amount WA is added to the amount W of adsorbed ammonia which is adsorbed at the $NO_X$ selective reduction catalyst 14. Next, at step 67, ΣNOX is cleared.

On the other hand, when it is judged at step 60 that the engine operating state is one where the first $NO_X$ removal method should be used to remove $NO_X$, the routine proceeds to step 68 where it is judged if the amount W of adsorbed ammonia which is adsorbed at the $NO_X$ selective reduction catalyst 14 is greater than the predetermined amount WX. When the amount W of adsorbed ammonia which is adsorbed at the $NO_X$ selective reduction catalyst 14 is greater than the predetermined amount WX, the routine proceeds to step 69 where regardless of the fact the engine operating state is one where the first $NO_X$ removal method should be used to remove $NO_X$, the action of removal of $NO_X$ by the first $NO_X$ removal method is stopped. Next, the routine proceeds to step 70. As opposed to this, when it is judged at step 68 that the amount W of adsorbed ammonia which is adsorbed at the $NO_X$ selective reduction catalyst 14 is smaller than the predetermined amount WX, the routine proceeds to step 73 where the action of removal of $NO_X$ by the first $NO_X$ removal method is performed. At this time, from the hydrocarbon feed valve 15, the amount WT of hydrocarbons which is calculated from the map which is shown in FIG. 11A is injected by an injection period ΔT which is calculated from the map which is shown in FIG. 11B.

Note that, as another embodiment, it is also possible to arrange an oxidation catalyst for reforming hydrocarbons inside the engine exhaust passage upstream of the exhaust purification catalyst 13.

REFERENCE SIGNS LIST

4 intake manifold
5 exhaust manifold
7 exhaust turbocharger
12 exhaust pipe
13 exhaust purification catalyst
14 $NO_X$ selective reduction catalyst
15 hydrocarbon feed valve

The invention claimed is:

1. A method of purifying exhaust gas exhausted from an internal combustion engine comprising an exhaust purification catalyst arranged in an engine exhaust passage, an $NO_x$ selective reduction catalyst arranged downstream of the exhaust purification catalyst in the engine exhaust passage, and a hydrocarbon feed valve arranged upstream of the exhaust purification catalyst in the engine exhaust passage, a precious metal catalyst is carried on an exhaust gas flow surface of the exhaust purification catalyst, a basicity layer is formed on the exhaust gas flow surface around the precious metal catalyst, the method comprising the steps of:
reducing $NO_x$ contained in an exhaust gas by a reducing intermediate which is held on the basicity layer and generated by injecting hydrocarbons from the hydrocarbon feed valve within a predetermined range of period in a first $NO_x$ removal step, and
making an air-fuel ratio of an exhaust gas flowing into the exhaust purification catalyst rich by a period which is longer than said predetermined range to release and reduce $NO_x$ which is stored in the exhaust purification catalyst when the air-fuel ratio of the exhaust gas is lean are used in a second $NO_x$ removal step, wherein
the second NOx removal step reduces the NOx contained in the exhaust gas by ammonia which is adsorbed at the NOx selective reduction catalyst,
the first $NO_x$ removal step is used when an amount of ammonia which is adsorbed at the $NO_x$ selective reduction catalyst is smaller than a predetermined amount at the time of a state when a temperature of the exhaust purification catalyst exceeds a predetermined temperature, and the first $NO_x$ removal step stops being used when the amount of ammonia which is adsorbed at the $NO_x$ selective reduction catalyst is greater than the predetermined amount at the time of a state when a temperature of the exhaust purification catalyst exceeds a predetermined temperature.

2. The method of purifying exhaust gas exhausted from an internal combustion engine as claimed in claim 1, wherein an ECU including a processor and memory is provided for calculating the amount of ammonia which is adsorbed at the $NO_x$ selective reduction catalyst, the first $NO_x$ removal step is used when the amount of ammonia which is calculated by the ECU is smaller than the predetermined amount at the time of the state when a temperature of the exhaust purification catalyst exceeds a predetermined temperature and the first $NO_x$ removal step stops being used when the amount of ammonia which is calculated by the ECU is greater than the predetermined amount at the time of a state when a temperature of the exhaust purification catalyst exceeds a predetermined temperature.

3. The method of purifying exhaust gas exhausted from an internal combustion engine as claimed in claim 1, wherein said predetermined amount is an amount whereby even if stopping the action of removal of $NO_x$ by the first $NO_x$ removal method, the ammonia which is adsorbed at the $NO_x$ selective reduction catalyst is enough to be able to reduce the $NO_x$ in the exhaust gas which flows into the $NO_x$ selective reduction catalyst.

4. The method of purifying exhaust gas exhausted from an internal combustion engine as claimed in claim 1, wherein when said second $NO_x$ removal step is being used, the ammonia which is generated at the exhaust purification catalyst when the air-fuel ratio of the exhaust gas flowing into the exhaust purification catalyst is made rich is adsorbed at the $NO_x$ selective reduction catalyst.

* * * * *